No. 666,111. Patented Jan. 15, 1901.
F. RAUBER & J. A. LENTZ.
LAWN MOWER.
(Application filed Jan. 25, 1900.)
(No Model.) 5 Sheets—Sheet 1.
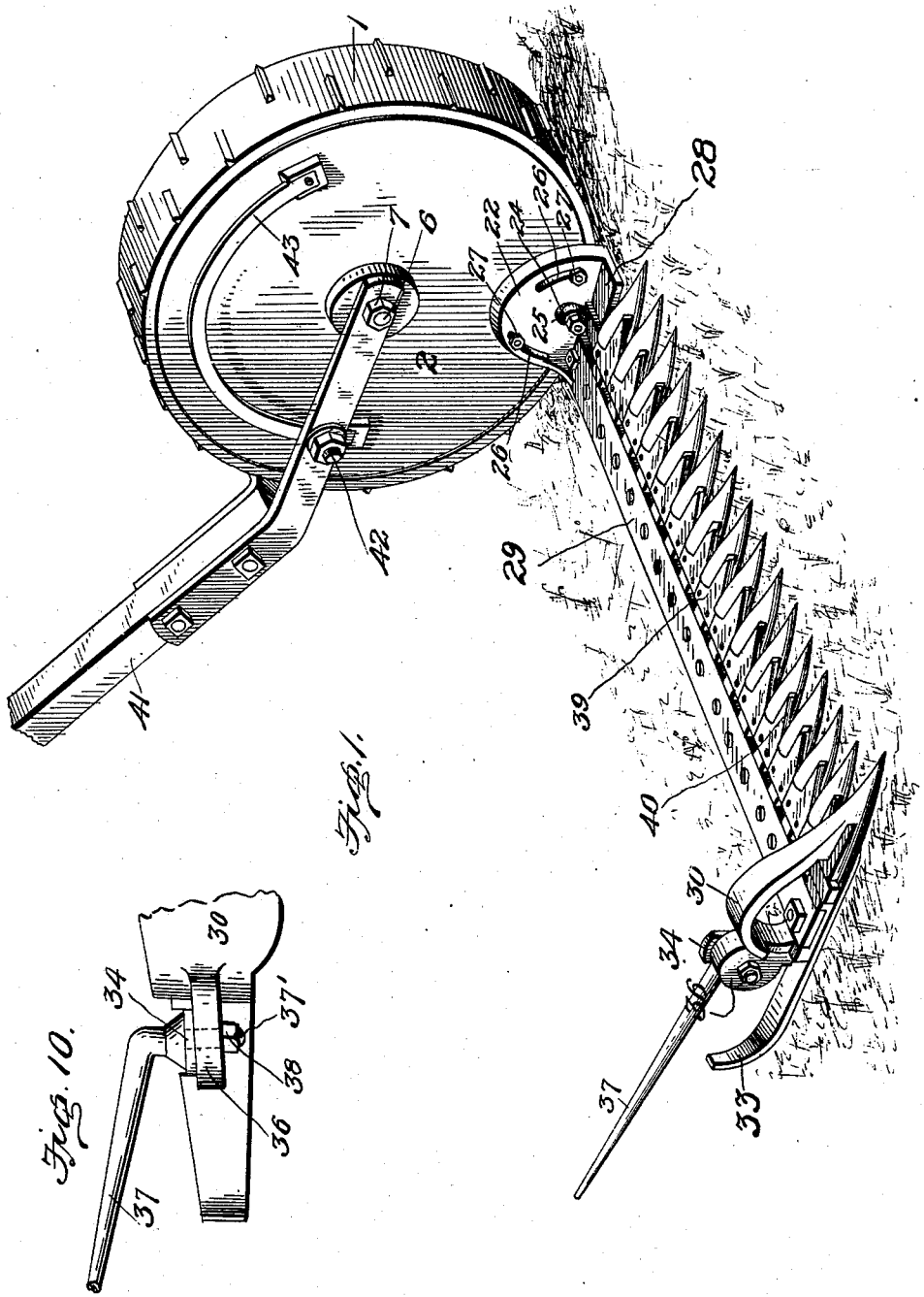
Witnesses
Inventors
Fritz Rauber
John A. Lentz
By H. B. Willson & Co.
Attorneys

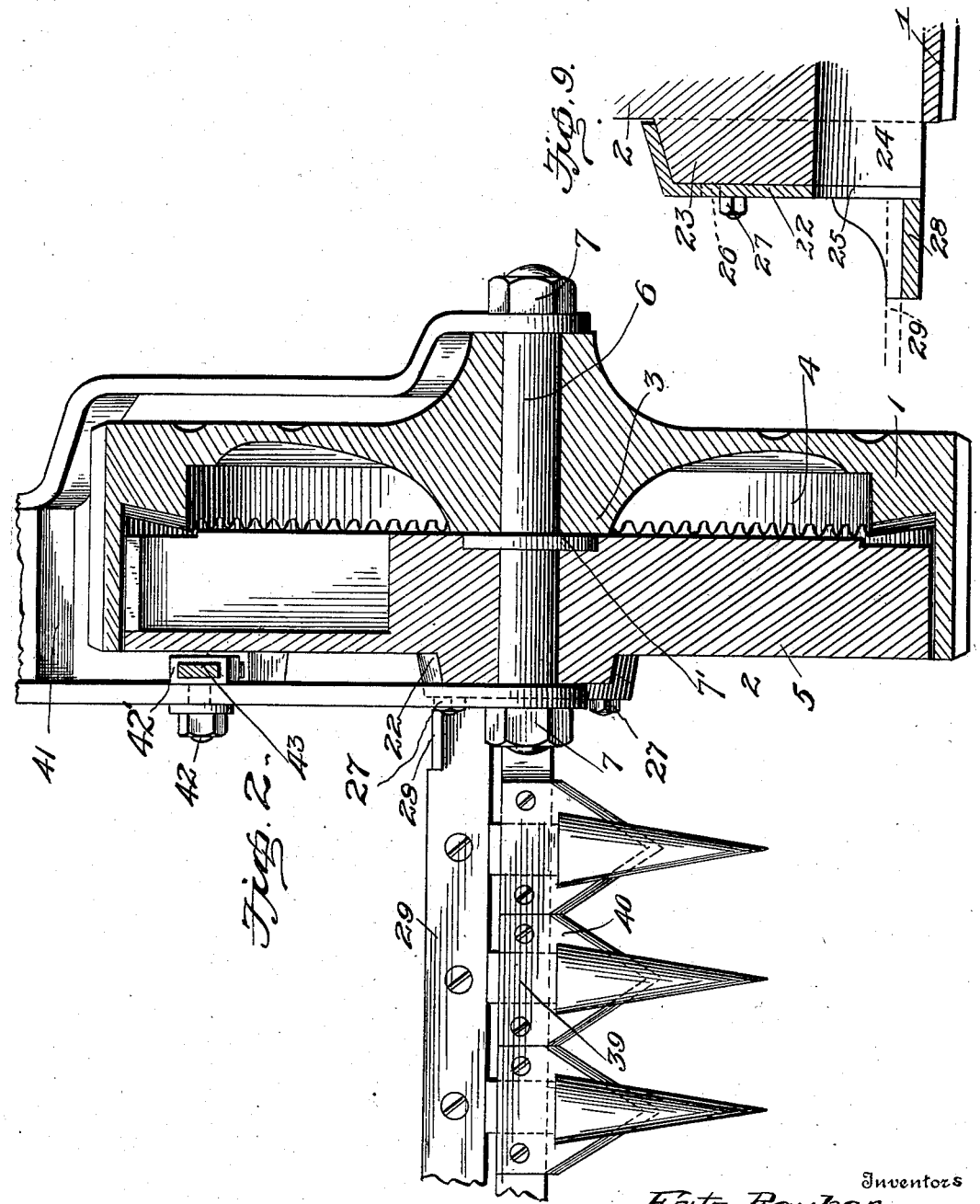

No. 666,111. Patented Jan. 15, 1901.
F. RAUBER & J. A. LENTZ.
LAWN MOWER.
(Application filed Jan. 25, 1900.)
(No Model.) 5 Sheets—Sheet 3.
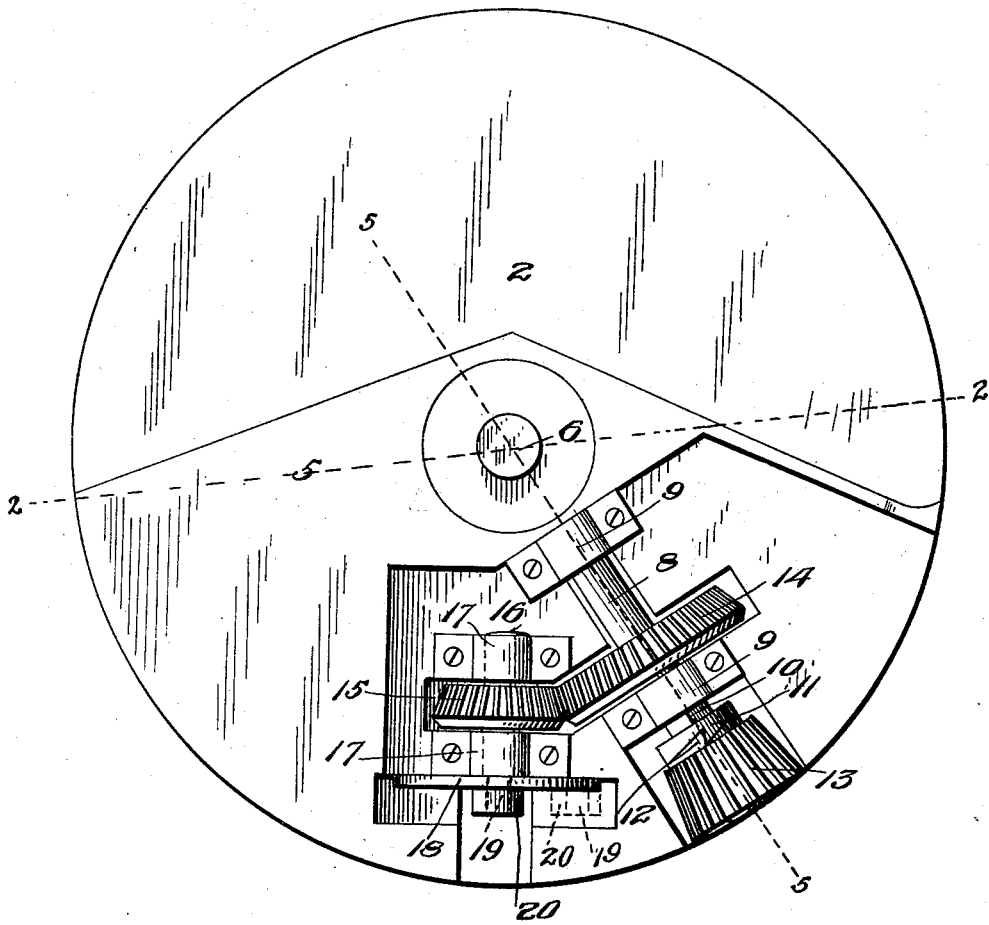
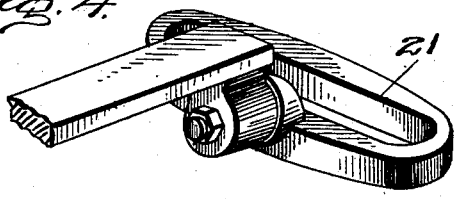
Witnesses
Inventors
Fritz Rauber
John A Lentz
by H. B. Willson & Co.
Attorneys No. 666,111. Patented Jan. 15, 1901.
F. RAUBER & J. A. LENTZ.
LAWN MOWER.
(Application filed Jan. 25, 1900.)
(No Model.) 5 Sheets—Sheet 4.
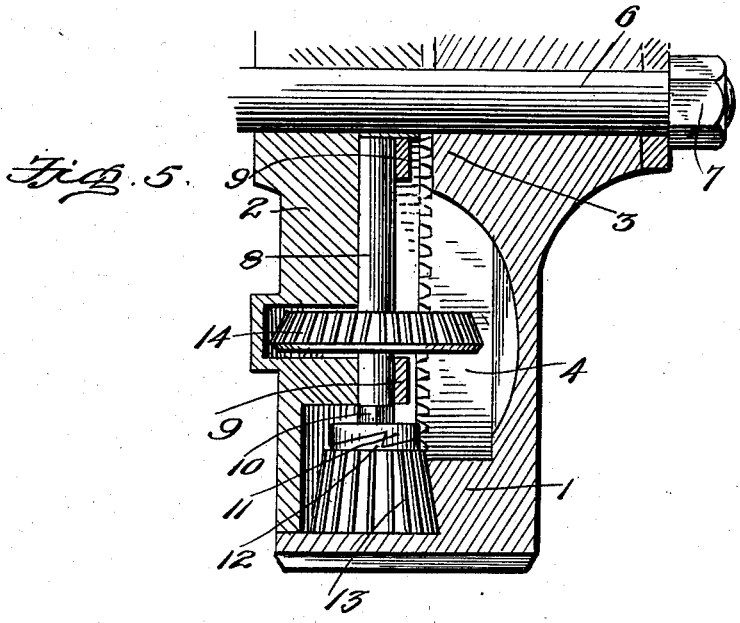
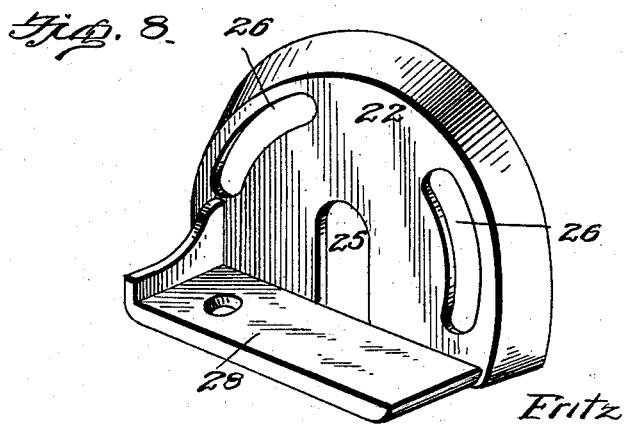
Witnesses
Inventors
Fritz Rauber
John A. Lentz
by
Attorneys
THE NORRIS PETERS CO., PHOTO-LITHO., WASHINGTON, D. C.

United States Patent Office.

FRITZ RAUBER AND JOHN A. LENTZ, OF ELDORADO, KANSAS.

LAWN-MOWER.

SPECIFICATION forming part of Letters Patent No. 666,111, dated January 15, 1901.

Application filed January 25, 1900. Serial No. 2,733. (No model.)

*To all whom it may concern:*

Be it known that we, FRITZ RAUBER and JOHN A. LENTZ, citizens of the United States, residing at Eldorado, in the county of Butler and State of Kansas, have invented certain new and useful Improvements in Lawn-Mowers; and we do declare the following to be a full, clear, and exact description of the invention, such as will enable others skilled in the art to which it appertains to make and use the same.

The invention relates to lawn-mowers, and more particularly to that type employing a reciprocating cutting apparatus similar to those used on reaping and mowing machines.

The object of the invention is to provide a lawn-mower of this type which shall be simple of construction, durable in use, comparatively inexpensive of production, easily operated, and efficient in action.

With this as well as other objects in view the invention consists in certain features of construction and combination of parts, which will be hereinafter fully described and claimed.

Figure 6:
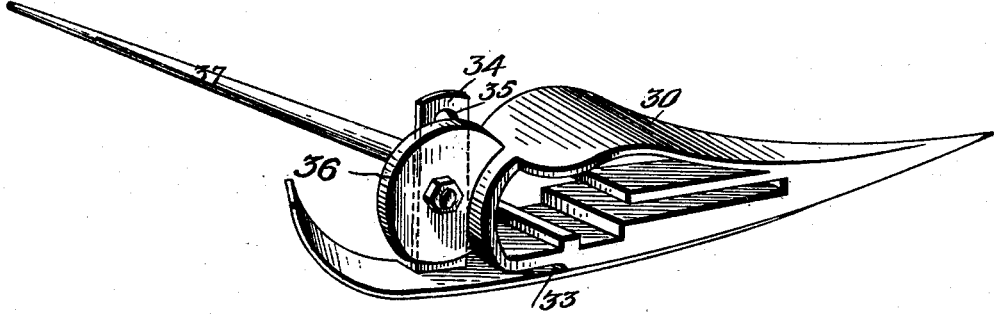
Figure 7:
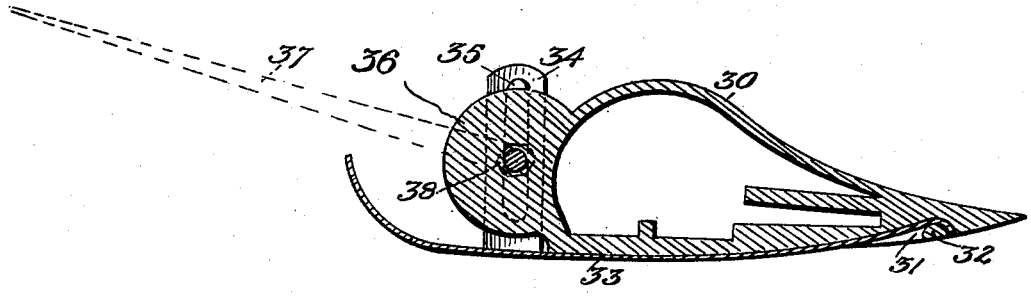

In the accompanying drawings, Figure 1 is a perspective view of the improved lawn-mower. Fig. 2 is a sectional plan view through the drive-wheel and gear-supporting disk, the section through the latter being taken on line 2 2 of Fig. 3. Fig. 3 is an elevation of the inner side of the gear-supporting disk. Fig. 4 is a detail perspective view of the cutter-bar link. Fig. 5 is a section on the line 5 5 of Fig. 3. Fig. 6 is a detail perspective view of the finger-bar shoe at the outer end of the cutting apparatus, showing the clearance-guard in position. Fig. 7 is a longitudinal sectional view through the same parts. Fig. 8 is a detail perspective view of the adjustable bracket for connecting the finger-bar to the gear-supporting disk. Fig. 9 is a detail vertical section through the adjustable bracket 22 and its supporting-block 23. Fig. 10 is a fragmentary plan view of the finger-bar shoe.

In the accompanying drawings the same reference characters indicate the same parts of the invention.
Referring to said drawings, 1 denotes the drive-wheel, and 2 the gear-supporting disk, which fits within the drive-wheel. The drive-wheel is provided with a central hub 3 and with an internal gear-wheel 4. The gear-supporting disk is provided with an enlargement 5, formed with suitable recesses to support the gearing hereinafter set forth. A shaft 6 extends through the center of the disk and through the hub of the drive-wheel and is provided at its ends with nuts 7 to hold the two parts together and intermediate its ends with a fixed collar 7'.

8 denotes a shaft extending radially from the shaft 6 and journaled in bearings 9. This shaft has a squared portion 10 intermediate its ends upon which is mounted to slide longitudinally of the shaft a clutch member 11, adapted to engage the clutch-face 12 of the pinion 13, mounted loosely upon the lower end of said shaft and in mesh with the internal gear 4 of the drive-wheel.

Above the clutch members is fixed to the shaft a beveled gear 14, which meshes with a bevel-pinion 15, fixed to a shaft 16, journaled in bearings 17. To the lower end of this shaft 16 is fixed a crank-wheel 18, the crank 19 of which is provided with a frictional roller 20, which engages the cutter-bar link 21.

22 denotes an adjustable bracket mounted upon an enlargement or block 23, formed integral or secured to the outer face of the disk and provided with a vertical slot 24, which registers with a similar slot 25, formed in the bracket. This bracket is provided with curved apertures 26 to receive bolts 27, projecting through said block and by means of which the bracket may be held in adjustment. This bracket is also provided with an integral shelf 28, to which is secured the finger-bar 29.
This finger-bar is provided at its outer end with the shoe 30, in the bottom of which is formed a slot 31, across which is a bridge-piece 32. A spring-sole 33 has its forward end located in said slot over the bridge-piece and its rear end provided with an upwardly-extending arm 34, formed with a vertical slot 35, through which and a rearward extension 36 of the guard extends the laterally-projecting shank 37' of the clearance-rod 37, upon which shank is screwed a nut 38 to hold the parts in proper adjustment.

39 denotes the cutter-bar, which is bolted to the cutter-bar link and is provided with the usual sickles 40.

41 denotes the handle, the lower end of which is provided with forked extensions which are pivoted to the outer ends of the shaft 6.

42 denotes an eyebolt, the eye part 42' of which engages a segmental strip 43, secured at the side of the disk and the bolt part of which extends through an aperture in one of the forked members and is provided with a nut. By this means the handle may be swung from one end of the curved bar to the other to permit of the mower being pushed or drawn in operation and is prevented from falling to the ground.

The operation of the machine is as follows: As it is pushed or drawn the internal gear on the drive-wheel engaging the drive-pinion will rotate the same. The clutch member on the squared portion of the shaft being held in engagement with the clutch member formed on the drive-pinion by gravity or, if desired, by a spring causes the shaft upon which it is placed to rotate, and thus rotates the beveled gear 14, fixed to the shaft. This beveled gear being in mesh with the pinion on the shaft to which the crank-wheel is secured rotates said pinion and crank-wheel. The crank-wheel being connected to the cutter-bar by the link reciprocates said cutter-bar in the guard-fingers.

If it be desired to change the inclination of the cutting apparatus, this may be done by loosening the nuts and adjusting the bracket to the desired position and then securing it in said position by tightening up the nuts.

To compensate for the adjustment of the bracket and support the cutting mechanism at the outer end, we adjust the spring-sole 33 accordingly, so that there will be no strain upon the finger and cutter bars.

It will be noticed that by providing the disk with a thickened portion below and slightly in advance of its axis the machine is properly balanced and, furthermore, provision is made for the bearings of the gearing. When the machine is drawn or pushed backward, the clutch members will slip by each other, thereby allowing the machine to be moved without operating its parts.

From the foregoing description, taken in connection with the accompanying drawings, the construction, operation, and advantages of our improved lawn-mower will be readily apparent without requiring an extended explanation.

It will be seen that the mower is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

1. In a lawn-mower, the combination with the drive-wheel, a gear-supporting disk, a cutting mechanism secured to the gear-supporting disk, of gearing operated by the rotary movement of the drive-wheel, mechanism for converting the rotary movement of the gearing into a reciprocating movement to actuate the cutter-bar, a handle having a forked end journaled to the axis of the disk and drive-wheel, a curved bar secured to the outer face of the disk, and means connecting one of the members of the forked lever with the curved bar, said means comprising an eyebolt, the eye of which engages said curved bar, and the bolt portion thereof being passed through said lever member and provided with a clamping-nut, substantially as described.

2. In a lawn-mower, the combination, with a drive-wheel provided with an internal gear, of a gear-supporting disk having an opening therein and mounted within the periphery of the wheel, gearing carried by said disk and in mesh with said internal gear and involving as part thereof a crank-wheel carrying a friction-roller, a bracket adjustably connected to the disk and provided with a vertical slot located in line with said opening in the disk, and a laterally-projecting shelf, a finger-bar secured to the said laterally-projecting shelf, a cutter-bar, and a link coöperating with the said friction-roller of the crank-wheel to impart reciprocatory motion to said bar and bolted to the bar through the said opening in the disk and vertical slot in the bracket, substantially as described.

In testimony whereof we have hereunto set our hands in presence of two subscribing witnesses.

FRITZ RAUBER.
JOHN A. LENTZ.

Witnesses:
L. F. SAMUELS,
WM. KELLEY.